United States Patent
Mason

[11] Patent Number: 5,917,598
[45] Date of Patent: Jun. 29, 1999

[54] METHOD AND APPARATUS FOR MEASURING THE ORIENTATION OF OPTICAL AXES

[75] Inventor: Philip L. Mason, Ottawa, Canada

[73] Assignee: Jatom Systems Incorporated, Kanata, Canada

[21] Appl. No.: 08/736,325

[22] Filed: Oct. 23, 1996

Related U.S. Application Data

[63] Continuation-in-part of application No. 08/638,218, Apr. 26, 1996
[60] Provisional application No. 60/008,220, May 12, 1995.
[51] Int. Cl.$^6$ .................................................. G01B 9/02
[52] U.S. Cl. ........................................ 356/351; 356/345
[58] Field of Search ................................. 356/345, 351; 385/12, 14

[56] References Cited

U.S. PATENT DOCUMENTS

| | | |
|---|---|---|
| 4,171,908 | 10/1979 | Robert et al. . |
| 4,563,093 | 1/1986 | Tada et al. . |
| 4,973,163 | 11/1990 | Sakai . |
| 5,229,834 | 7/1993 | Lequime . |
| 5,400,131 | 3/1995 | Stocklet et al. . |

*Primary Examiner*—Robert Kim

*Attorney, Agent, or Firm*—Neil Teitelbaum & Associates

[57] ABSTRACT

This invention provides an optical and computation system that does not utilize moving parts, which enables the angular orientation of the optical axes on the surface of a birefringent material to be determined and comparably, the orientation of the optical axes within light emerging from that surface. Further, since this invention considers the relative orientations of the preferred axis or axes of polarization within light, this method is also applicable for determining the angular orientation of the preferred axis of polarization of elliptically or linearly polarized light or the orientation of the polarizing axis of the material causing the preferred direction of polarization. For birefringent generated axes, this invention allows for the principal axis to be identified distinctly from the quadrature axis and without ambiguity. This is achieved by consideration of the relative intensities of the light emerging from the birefringent or polarizing material when observed through a plurality of linear or elliptical polarizers whose axes are set at known and distinct orientations to the reference direction of the measurement system, and with the ambiguities in the determination of the principal axis in the birefringent system removed by use of the phase of the interference patterns resulting when the light passing along the principal and quadrature axes within the birefringent material is combined by the linear or elliptical polarizers.

28 Claims, 6 Drawing Sheets

METHOD AND APPARATUS FOR MEASURING THE ORIENTATION OF OPTICAL AXES

CROSS REFERENCES

This is a continuation-in-part application of earlier filed patent application Ser. No. 08/638,218 filed Apr. 26, 1996 which claims priority from provisional patent application Ser. No. 60/008,220 filed May 12, 1995.

FIELD OF THE INVENTION

This invention relates generally to the field of optical measuring methods and devices, and more specifically to a method and apparatus for measuring the angular orientation of the optical axes of light emerging from the surface of a birefringent material and thus the angular orientation of the optical axes on the surface of the birefringent material. This invention also has applicability to determining the preferred axis of polarization of any elliptically or linearly polarized light or material.

BACKGROUND TO THE INVENTION

This invention discloses an optical and computation system that does not utilize moving parts, which enables the angular orientation of the optical axes on the surface of a birefringent material to be determined and comparably, the orientation of the optical axes within light emerging from that surface. Further, since this invention considers the relative orientations of the preferred axis or axes of polarization within light, this method is also applicable for determining the angular orientation of the preferred axis of polarization of elliptically or linearly polarized light or the orientation of the polarizing axis of the material causing the preferred direction of polarization. For birefringent generated axes, this invention allows for the principal axis to be identified distinctly from the quadrature axis and without ambiguity. This is achieved by consideration of the relative intensities of the light emerging from the birefringent or polarizing material when observed through a plurality of linear or elliptical polarizers whose axes are set at known and distinct orientations to the reference direction of the measurement system, and with the ambiguities in the determination of the principal axis in the birefringent system removed by use of the phase of the interference patterns resulting when the light passing along the principal and quadrature axes within the birefringent material is combined by the linear or elliptical polarizers.

Classically when the axial directions of birefringent material have been considered, it has been in the context of photo-elastic measurement techniques. These generally utilize a combination of observations using linear polarized light to identify regions of similar optical axial directions, isoclinics, superimposed on fringes of comparable optical retardation, isochromatics; and the subsequent use of circular polarized light to separate the isoclinics from the isochromatics: procedures requiring operator intervention and decision making and further, requiring changes to the equipment and use of rotating linear polarizers to measure the axial directions. There have been several approaches to overcoming the need for operator intervention and decisions, which have recognised that if the emerging light is scanned in a circular fashion with a linear or near linear elliptical polarizer, the intensity of the light varies sinusoidally as a function of rotation angle, with four complete cycles discernable in the case of birefringence and two cycles for linear or elliptical polarization for each $2\pi$ of rotation; consideration of the angular locations of the intensity maxima and minima then establishes the angular location of the optical axes. However this approach does not separately identify the principal axis within the birefringent material, being that aligned to the optical axis in the material along which light passes faster than along the axis in quadrature.

SUMMARY OF THE INVENTION

The present invention aims to provide methods and apparatus for determining the orientation of optical axes automatically without operator decisions or intervention and without ambiguity, while avoiding the drawbacks and limitations outlined above.

Accordingly the invention provides methods and devices for determining the axial directions established in a birefringent material, or in the light emerging from a birefringent material, or in linear or elliptically polarized light, or in materials causing linear or elliptical polarization. This invention is applicable for use with all natures of non-opaque materials, in both transmitting and reflection configurations, does not use mechanically moving or rotating optical elements or parts and further, does not require close contact with the material. Additionally this invention provides for the unambiguous identification of the principal and quadrature axes associated with birefringent materials.

The invention relates to the determination of the axial directions of the optical axes by consideration of intensities that can be measured by passing light that has emerged from the birefringent or polarizing material through a set of linear or near linear elliptical polarizers and by removing ambiguities by consideration of the phase of the interference patterns resulting from the combining actions of the polarizers acting on the light emerging from the birefringent material. The interference patterns may be obtained by measuring the spectral energy distributions for the light passing through each of the polarizers, and then demodulating each spectral energy distribution by normalising using a function either previously recorded and stored or created by the summing and scaling of the spectral energy distributions from each of the polarisers.

The intensity of polarized light that has passed through a birefringent material or unpolarized light that has passed through a linear or elliptical polarizing material and subsequently through a linear or near linear elliptical polarizer varies in accordance with a sine function of the angle between the axes or axis of the material and the axis of the polarizer. Thus if several linear or near linear elliptical polarizers are arranged so as to each simultaneously receive some of the light from the material, then the intensity of the light passing through each is related by a predeterminable sine relationship based on the relative orientation between the axes of the polarizers and the orientation of the axis or axes in the material with respect to the axes of the polarizers. The relative intensities may be obtained by considering the total energy received by each polarizer, ie. without applying any band limitation to the bandwidth of the light source other than that of the materials themselves and the measuring equipment used; or by consideration of the energy passing through the polarizers within a limited and predetermined bandwidth or several predetermined bandwidths; or by consideration of the intensities at a particular wavelength achieved either by using a light source of limited bandwidth eg. a laser, or by effectively notch filtering the light, either before or after it has passed through the material and before its intensity is measured; or by spectral separation of the light and the acceptance of information representing energy at only the particular wavelength.

In accordance with the invention, there is provided a method for determining the directions of optical axes existing in birefringent material, or the preferred axis of polarization on other non-opaque materials comprising the steps of:

a) providing input light, including multiple wavelengths of light, having a predetermined polarization state;

b) passing at least some of the light through plural combining means for combining the quadrature components of at least some of the light that has passed through at least some of the material to cause some of that light to interfere, and for which each combining means is set at a known direction;

c) detecting and recording information, for each of the plural combining means, corresponding to the intensity of at least some of the light passed through the combining means to obtain plural intensity measurements;

d) in dependence upon the intensity measurements, using a suitably programmed computer or other computational means to calculate the optical axes directions existing in the birefringent material, or the preferred axis of polarization in other materials, by utilizing the relative intensities from two or more of the combining means, the known directions of the axes of these combining means, and the theoretical variations in intensities to be expected from each of these combining means when light of the predetermined polarization state is passed through birefringent material having principal and quadrature optical axes or through other materials which polarize light, and further to relate these directions to the reference direction of the material.

In accordance with another aspect of the invention there is provided a method of determining the directions of optical axes existing in birefringent material having principal and quadrature optical axes, or a preferred axis of polarization of other materials comprising the steps of:

a) providing input light, including multiple wavelengths of light, having a predetermined polarization state to the material;

b) passing at least some of the light through plural combining means for combining the quadrature components of at least some of the light that has passed through at least some of the material to cause some of that light to interfere, and for which the axis of each combining means is set at a known direction;

c) for each of the combining means, spectrally separating at least some of the light that has passed through the combining means, by passing at least some of the light through spectral separation means, d) detecting and recording information, for each of the plural combining means, corresponding to intensity and wavelength of at least some of the light that has passed through the combining means and the spectral separation means, to obtain plural spectral signatures, wherein each of the spectral signatures comprises differing amplitudes relating to at least a plurality of the multiple wavelengths of light;

e) in dependence upon the spectral signatures, calculating direction or directions of the optical axis existing in the material by using a suitably programmed computer or other computational means and utilizing the signal amplitudes in the spectral signatures from two or more of the combining means, the known directions of the axes of these combining means, and the phase of the amplitude variations when compared to amplitude variations to be expected in the spectral signatures from each of these combining means when light of the predetermined polarization state is passed through material possessing a similar polarizing axis or characteristic principal and quadrature optical axes and birefringence similar to that existing in the material, and further to relate these directions to the reference direction of the material.

In accordance with the invention there is further provided an apparatus for use in determining the directions of the characteristic principal and quadrature optical axes within a birefringent material, or the preferred axis of polarization in other materials, comprising:

means, including a light source, for providing polarized light, means for combining quadrature components of some of this light that has passed through the material thereby inducing interference, the optical axes of the combining means being at different but known directions, means for measuring intensity of the combined light, means for storing intensity measurements, computation means programmed to compare the stored intensity values obtained from the combining means, and based upon the intensity values and the known directions of the axes of the combining means, to calculate the direction of the principal axis within the birefringent material and of the axis in quadrature to the principal axis, or the axis of polarization in other materials, these directions being calculated in reference to the reference for the directions of the axes of the combining means, and further to relate these directions to the reference direction of the material.

In accordance with another aspect of the invention there is further provided an apparatus for use in determining the directions of the characteristic principal and quadrature optical axes within a birefringent material, or the preferred axis of polarization in other materials, comprising:

means including a light source for providing polarized light containing a plurality of wavelengths to the material, plural means for combining quadrature components of some of the light that has passed through the birefringent material to induce spectral interference, the optical axes of the plural combining means being at different but known directions, spectral separation means for receiving the light from the plurality of combining means and spatially separating the light on the basis of wavelength, means for measuring intensity of received separated light and for measuring intensity at a plurality of wavelengths, means for storing intensity measurements, computation means programmed to provide spectral arrays from information relating to the stored intensity measurements obtained from the combining means, and based upon the intensity values and the known directions of the axes of the combining means, to calculate the direction of the principal axis within the birefringent material and of the axis in quadrature to the principal axis, or the preferred direction of polarization in other materials, these directions being calculated with respect to the reference direction for the axes of the combining means, and further to relate these directions to the reference direction of the material.

BRIEF DESCRIPTION OF THE DRAWINGS

A preferred embodiment of the present invention will now be described, by way of example only, with reference to the accompanying drawings in which:

FIGS. 2a, 2b and 2c are a set of typical spectral intensity patterns, FIG. 2a shows a set of patterns when retardation is occurring, FIG. 2b a pattern for light received by the observer in the absence of retardation, FIG. 2c a created pattern replicating the pattern for no retardation but created from a plurality of observations made in the presence of retardation;

DETAILED DESCRIPTION OF THE INVENTION

The object of the apparatus and methods disclosed in this invention is the measurement of the directions of optical axes or preferred directions of polarization. The methods are applicable for use in determining the optical axes on the surface of a birefringent material and in light emerging from birefringent material; and for determining the preferred axis of polarization of elliptical or linear polarizers or in light that is elliptically or linearly polarized. This description will consider the case of determining the optical axes on the surface of a piece of birefringent material; first it will describe how the phase of the interference patterns generated by combining light that has passed along each of the axes may be determined, then how the optical axes directions on the surface of the optical coating may be determined such that the principal axis is uniquely defined within a 180 degree arc.

Figure 1:
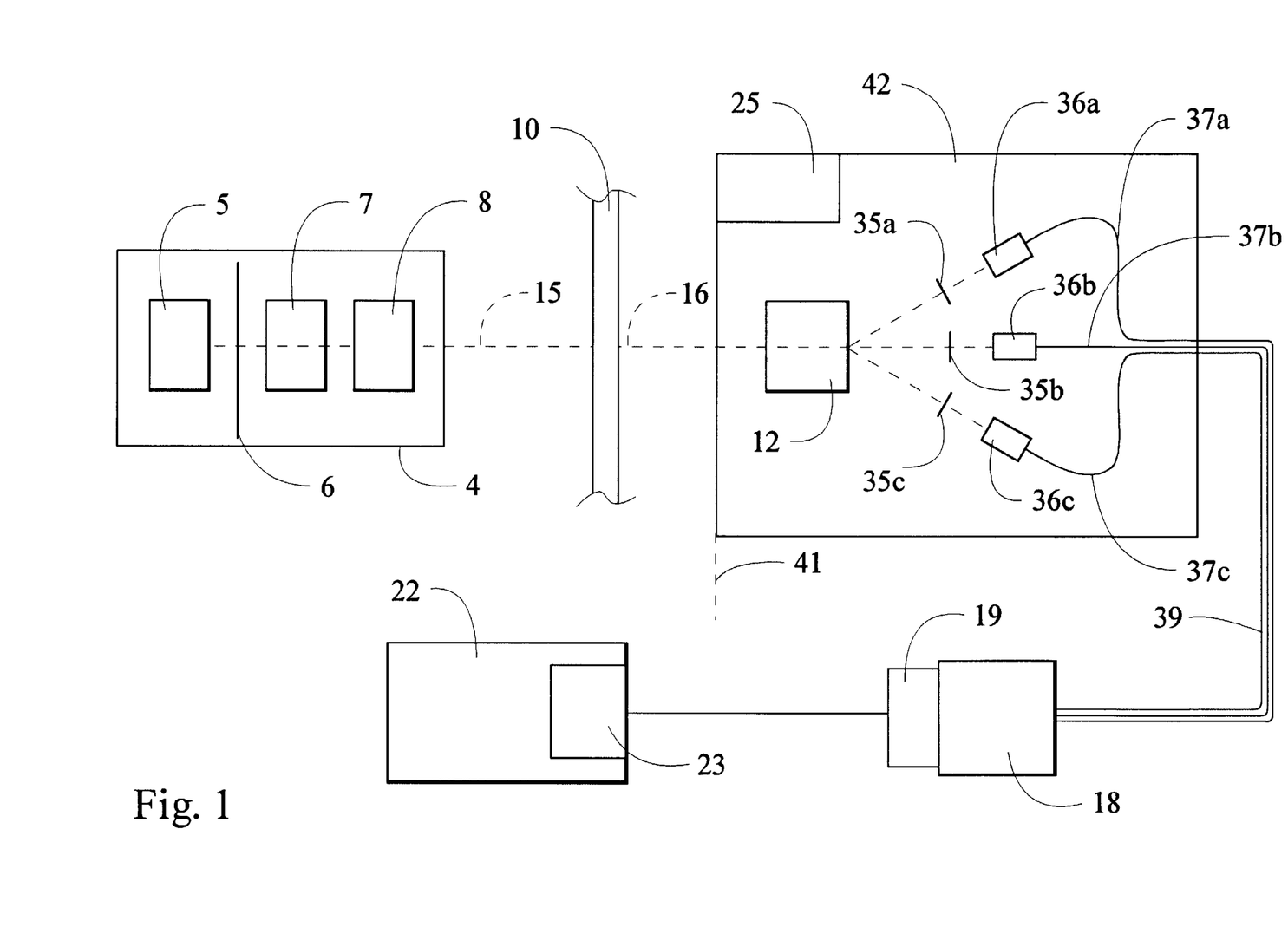
FIG. 1 is a block diagram representation of the apparatus according to a preferred embodiment of the present invention.

The method and apparatus for determining the orientation of the optical axes will be described by way of the preferred embodiment of the present invention. Referring to FIG. 1, an optical illuminating system 4, comprising a broad spectrum source 5, a linear polarizer 6, and a Fresnel rhomb 7, using a combination of focussing and directing optical elements 8, directs circular polarized light 15, onto the birefringent material 10. Light 16, that has passed through the birefringent material is collected and directed by further optical elements 12, to a set of three linear polarizers 35a, 35b, and 35c, the axes of which are set at any known angular separation to each other, but preferably 120°, and at a known orientation offset to the reference axis 41, of the housing 42, supporting these optical elements and polarizers. The light directed onto the birefringent material may be considered as passing through the material as if it were vectorially separated to constrain it to pass along the directions of the principal optical axis and the quadrature optical axis existing in the material. The refractive index of the material, and correspondingly the velocity of the light passing through the material varies from one axis to the other in accordance with the magnitude of the birefringence. The linear polarizers 35a, 35b, and 35c, combine the quadrature components of some of the light that has passed through the material. The combined light that has passed through each polarizer is coupled into separate optical fibres 37a, 37b, and 37c, by separate coupling lens systems 36a, 36b, and 36c, and conveyed through an optical fibre bundle 39, to a holographic grating spectrometer 18, which is arranged to spectrally separate each input in parallel and convey the spectrally separated light onto the two dimensional detector of a solid state camera 19, such that each spectrally separated output occupies a separate and definable band across the detector. The intensity values of each pixel of the detector of the camera are measured, digitized and stored in the memory of a digital computer 22, under control of software running in that computer and using a digitizing interface card 23, installed in the computer. The camera is installed in the spectrometer so that the axis of the detector containing the greatest number of pixels is in the same direction as the direction of wavelength separation established by the holographic grating.

The relative angular separation between the reference axis of the material, typically an edge, and the reference axis 41, of the housing 42, the offset, is established either directly using an inclinometer and sighting system 25, mounted on the housing, or by measuring the angle that each reference makes with respect to a common reference, eg. local horizontal, and then calculating the relative angular separation.

The digitized intensity values obtained from each pixel are a measure of the spectral energy being received by each polarizer at the wavelength represented by the pixel location. Thus, within the computer, spectral intensity arrays $SP_0(i)$, $SP_{120}(i)$ and $SP_{240}(i)$, i=1, ... ,n, can be created by summing the digitized intensity values for all the pixels in columns m+(i−1).w to m+i.w−1, for i=1, ... ,n, in rows $k_1$ to $k_2$ for array $SP_0$, rows $k_3$ to $k_4$ for array $SP_{120}$, and rows $k_5$ to $k_6$ for array $SP_{240}$. Where column m is the first column of the detector receiving measurable intensities, column m+i.w−1 being the last column with measurable received intensity, each group of summed columns being w columns wide; and where rows $k_1$ to $k_2$ receive the spectrally separated light originating from the linear polarizer combining means whose axis of polarization is set at the direction of 0°+offset from the housing reference, $k_3$ to $k_4$ receive spectrally separated light originating from linear polarizer combining means whose axis of polarization is set at 120°+offset from the reference, and $k_5$ to $k_6$ receive spectrally separated light originating from the linear polarizer combining means whose axis of polarization is set at 240°+offset from the reference. The wavelength of the spectrally separated light falling on the middle of each column group is $\lambda$, $\lambda+\delta\lambda$, $\lambda+2\delta\lambda$, ... , $\lambda+(n-1)\delta\lambda$, where $\delta\lambda$ is the incremental wavelength between successive groups of columns. Accordingly, since each entry in the above, and subsequently to be derived, arrays represent a determinable wavelength, all subsequent arrays will be described in terms of the variable $\lambda$, eg. $SP_0(\lambda)$.

Spectral intensity arrays are obtained:

initially and as part of the equipment set up for the case where no light enters the combining polarizers, as $SP_{0\text{-}dark\ current}(\lambda)$, $SP_{120\text{-}dark\ current}(\lambda)$ and $SP_{240\text{-}dark\ current}(\lambda)$, again as part of the setup for the system when no retardation is being introduced by the birefringent material, or in its absence, as $SP_{0\text{-}no\ retardation}(\lambda)$, $SP_{120\text{-}no\ retardation}(\lambda)$, and $SP_{240\text{-}no\ retardation}(\lambda)$, and for measurement purposes, when the birefringent material is inserting retardation, as $SP_{0-retardation}(\lambda)$, $SP_{120-retardation}(\lambda)$, and $SP_{240-retardation}(\lambda)$.

The $SP_{0-dark\ current}(\lambda)$, $SP_{120-dark\ current}(\lambda)$ and $SP_{240-dark\ current}(\lambda)$, are biases in the measured intensity readings occurring due to biases, offsets and defects in the camera, detectors and interface card. By measuring them as part of the set up, these biases can be removed from subsequent intensity measurements by subtraction as:

$$SP^*_{ii-no\ retardation}(\lambda) = SP_{ii-no\ retardation}(\lambda) - SP_{ii-dark\ current}(\lambda)$$

$SP^*_{ii-retardation}(\lambda) = SP_{ii-retardation}(\lambda) - SP_{ii-dark\ current}(\lambda)$
where ii=0, 120 and 240.

Figure 2A:
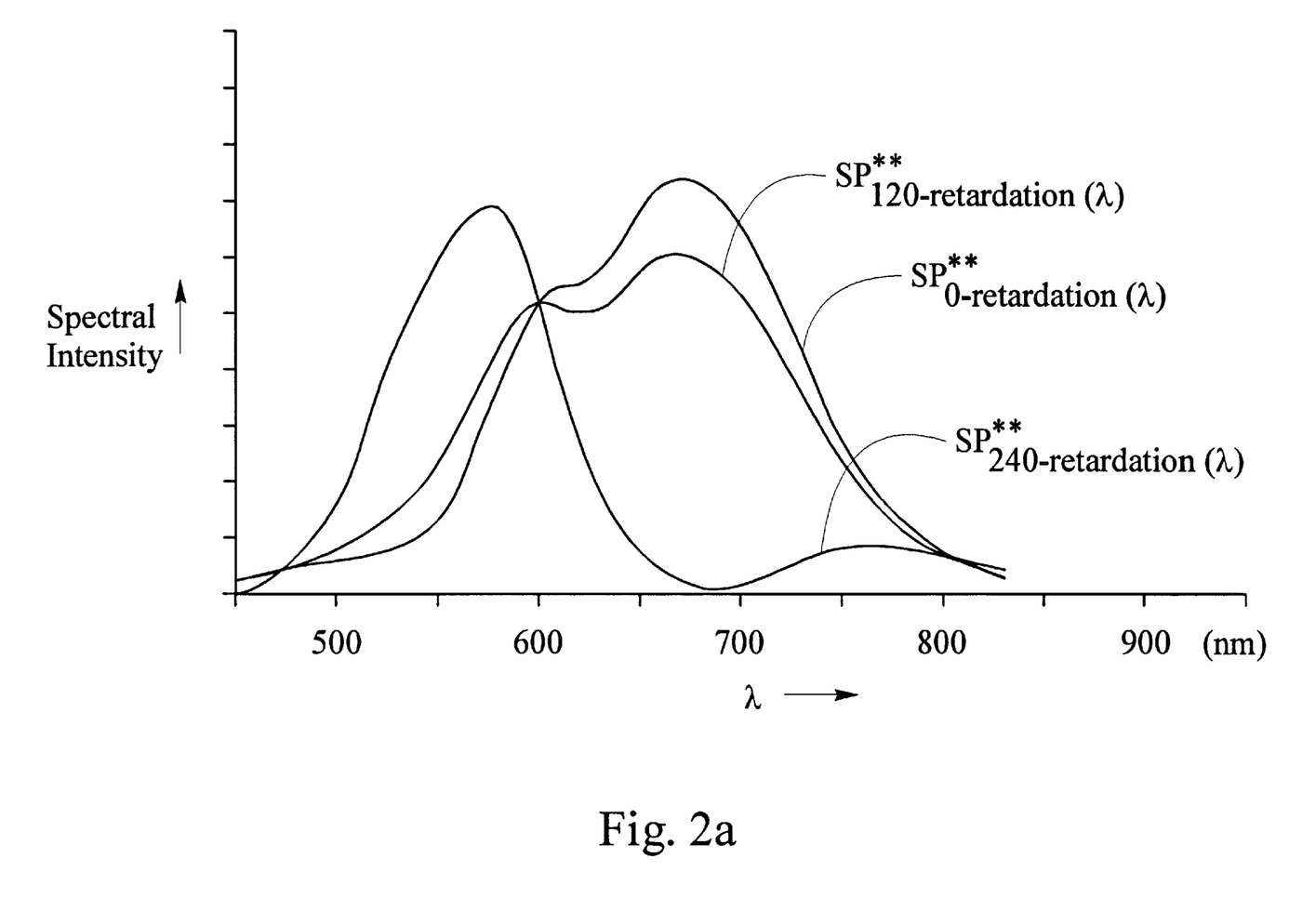
Figure 2B:
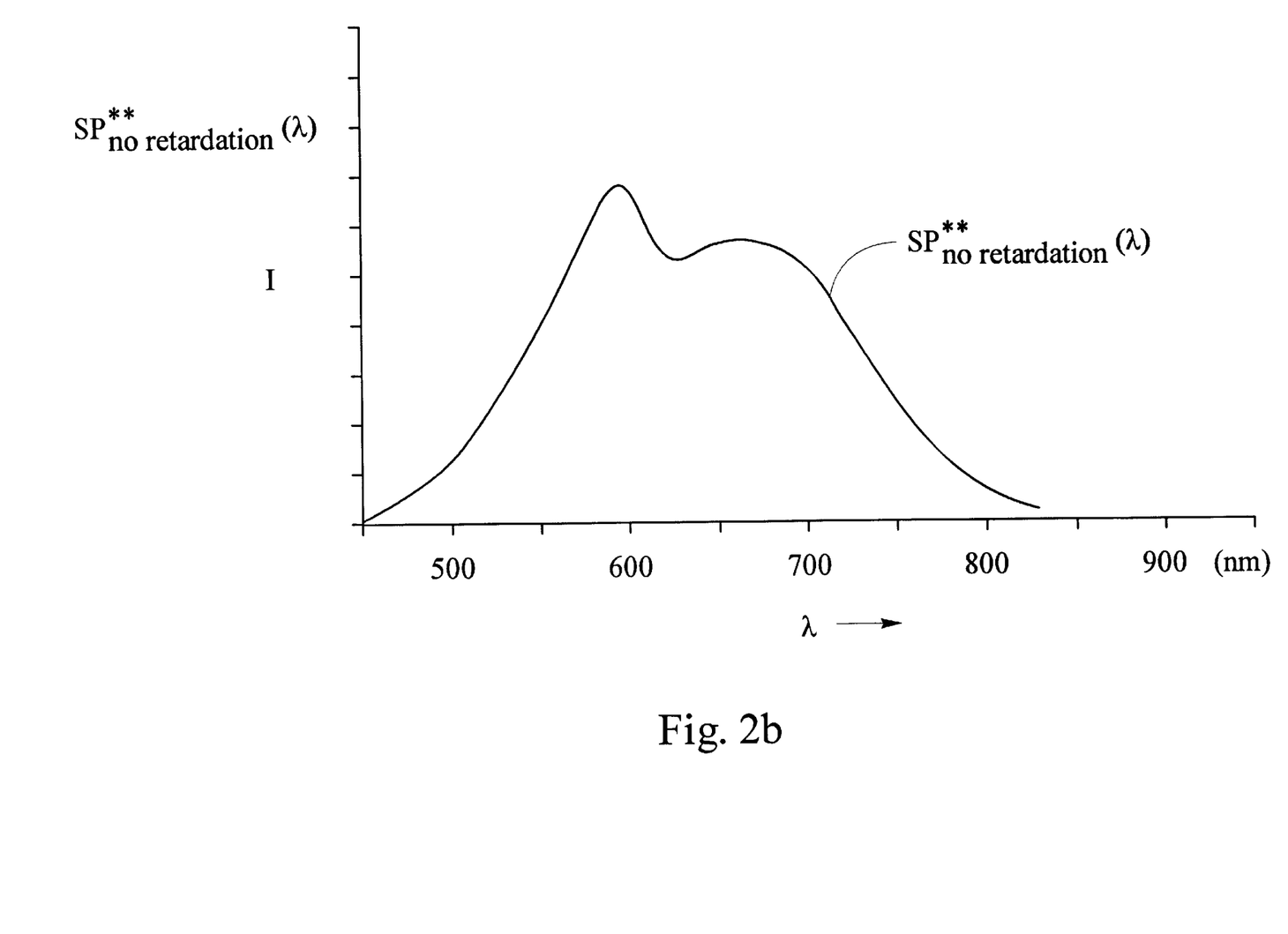

The spectral intensity measurements $SP^*_{0-no\ retardation}(\lambda)$, $SP^*_{120-no\ retardation}(\lambda)$, and $SP^*_{240-no\ retardation}(\lambda)$ are used to form equalization correction functions:

$$EQ_{ii}(\lambda) = \text{largest of } \frac{SP*_{0-no\ retardation}(\lambda)}{SP*_{ii-no\ retardation}(\lambda)}$$

$$\text{or } \frac{SP*_{120-no\ retardation}(\lambda)}{SP*_{ii-no\ retardation}(\lambda)}$$

$$\text{or } \frac{SP*_{240-no\ retardation}(\lambda)}{SP*_{ii-no\ retardation}(\lambda)}$$

on a $\lambda$ by $\lambda$ basis, where ii = 0, 120 and 240.

which are applied to each spectral intensity measurement to compensate for variations in attenuation for light passing through the different combining devices and associated optical elements.

$$SP_{ii-retardation}^{}(\lambda) = EQ_{ii}(\lambda) \cdot SP_{ii-retardation}^{}(\lambda)$$

where ii=0, 120 and 240.

a typical set of these curves are illustrated in FIG. 2a.
After the above channel attenuation $$SP_{ii-no\ retardation}^{}(\lambda) = EQ_{ii}(\lambda) \cdot SP_{ii-no\ retardation}^{}(\lambda)$$

for ii=0, 120 and 240.

hence $$SP_{no\ retardation}^{}(\lambda) = SP_{0-no\ retardation}^{}(\lambda) = SP_{120-no\ retardation}^{}(\lambda) = SP_{240-no\ retardation}^{}(\lambda)$$

a typical curve for which is illustrated in FIG. 2b.
Thus the ratios $$\frac{SP**_{ii-retardation}(\lambda)}{SP*_{ii-no\ retardation}(\lambda)} = \frac{SP_{ii-retardation}(\lambda)}{SP_{no\ retardation}(\lambda)}$$

may be formed for each of ii=0, 120 and 240, and since both the numerator and denominator are subject to the same optical inefficiencies, attenuations, quantum efficiencies and source variations, these are removed.

Now to consider, with the aid of the Jones calculus the overall optical system and the processes that generate the interference patterns $SP_{ii-retardation}(\lambda)$ and $SP_{no\ retardation}(\lambda)$. However instead of defining the reference direction for the analysis as the direction of the linear polarizer used in the circular polarizing function, the direction of the principal axis of the birefringent material will be used, and further recognize that the circular polarized light will pass equally along both of the axes of the birefringent material. Then if $E_{cp}$ is the vector describing the electric field of the input circular polarized light directed at the birefringent material, $|M_{bm}|$ is the matrix describing the birefringent material process introducing retardation between light passing along its orthogonal optical axes, $|M_{lp}|$ the matrix describing the linear polarizing process of the combining device, then $E_0$, the vector describing the electric field of the output from the combining linear polarizer is formed as:

$$E_o = |M_{lp}| |M_{bm}| E_{cp}$$

substituting and expanding for the case where $\phi$ retardation is introduced by the birefringent material between light passing along one optical axis and light passing along the other optical axis, the axis of the combining linear polarizer is at angle $\alpha$ to the principal axis of the birefringent material and there is unity input intensity, then:

$$E_o = \frac{1}{\sqrt{2}} \begin{bmatrix} \cos\alpha & \sin\alpha \\ 0 & 0 \end{bmatrix} \begin{bmatrix} 1 & 0 \\ 0 & e^{i\phi} \end{bmatrix} \begin{bmatrix} 1 \\ i \end{bmatrix}$$

$$= \frac{1}{\sqrt{2}} \begin{bmatrix} \cos\alpha + ie^{i\phi}\sin\alpha \\ 0 \end{bmatrix}$$

Now the intensity, $I_o$, is equal to the sum of the squares of the amplitudes of the electric components of the light wave, or in matrix form, the product of premultiplying $E_o$ with its Hemetian adjoint, which is defined as the complex conjugate of the transpose of the matrix, thus:

$$I_o = E_o^{T*} \cdot E_o$$

$$= \frac{1}{\sqrt{2}}[\cos\alpha - ie^{-i\phi}\sin\alpha\ 0]\frac{1}{\sqrt{2}}\begin{bmatrix} \cos\alpha + ie^{i\phi}\sin\alpha \\ 0 \end{bmatrix}$$

$$= \frac{1}{2}\{1 + i\sin\alpha\cos\alpha\,(e^{i\phi} - e^{-i\phi})\}$$

$$= \frac{1}{2}\{1 - \sin(2\alpha)\sin\phi\}$$

For the condition of no retardation, $\phi=0$, thus $\sin\phi=0$, and $I_o$ reduces to $I_o=\frac{1}{2}$, thus whatever angle the axis of the combining polarizer is set at, only half the input intensity will emerge. Therefore it follows that:

$$\frac{I_{o(retardation)}}{I_{o(no\ retardation)}} = \frac{1/2\{1 - \sin(2\alpha)\sin\phi\}}{1/2}$$

$$= 1 - \sin(2\alpha)\sin\phi$$

Thus there is a modulation function, $\sin\phi$, with amplitude controlled by $\sin(2\alpha)$, which is non-varying for a given alignment between the axes of the birefringent material and the axis of the combining polarizer. Now consider this expression and expand this applicable for each of the three combining devices, and also note that an axis oriented at +240° is also oriented at +60° and that at +120° is also at −60°.

$$\frac{I_{o(0-retardation)}}{I_{o(no\ retardation)}} = 1 - \sin(2\alpha)\sin\phi$$

$$\frac{I_{o(240-retardation)}}{I_{o(no\ retardation)}} = 1 - \sin 2(\alpha + 60)\sin\phi$$

$$= 1 - \frac{\sin\phi}{2}\{\sqrt{3}\cos(2\alpha) - \sin(2\alpha)\}$$

$$\frac{I_{o(120-retardation)}}{I_{o(no\ retardation)}} = 1 - \sin 2(\alpha - 60)\sin\phi$$

$$= 1 + \frac{\sin\phi}{2}\{\sin(2\alpha) + \sqrt{3}\cos(2\alpha)\}$$

these individual intensities may be summed:

$$\frac{I_{o(0-retardation)} + I_{o(240-retardation)} + I_{o(120-retardation)}}{I_{o(no\ retardation)}} = 1 - \sin(2\alpha)\sin\phi +$$

$$1 - \frac{\sqrt{3}}{2}\sin\phi\cos(2\alpha) +$$

$$\frac{1}{2}\sin(2\alpha)\sin\phi + 1 +$$

$$\frac{\sqrt{3}}{2}\sin\phi\cos(2\alpha) +$$

$$\frac{1}{2}\sin(2\alpha)\sin\phi$$

$$= 3$$

which provides that the output intensity at any angle under no retardation conditions can be determined by summing the output intensities measured through the three combining linear polarizers (each set at 120° to each other) for the condition where retardation is occurring. Thus a normalising or demodulation function can be created or produced each time a retardation measurement is made, thereby accommodating any time variations in the spectral performance of the optical system and in particular changes in both intensity and spectral content of the light source.

$$I_{o(no\ retardation)} = \frac{I_{o(0-retardation)} + I_{o(240-retardation)} + I_{o(120-retardation)}}{3}$$

And comparably:

$$SP^{created}_{o(no\ retardation)}(\lambda) \cong SP''_{no-retardation}(\lambda)$$

$$= \frac{SP''_{0-retardation}(\lambda) + SP''_{240-retardation}(\lambda) + SP''_{240-retardation}(\lambda)}{3}$$

Figure 2C:
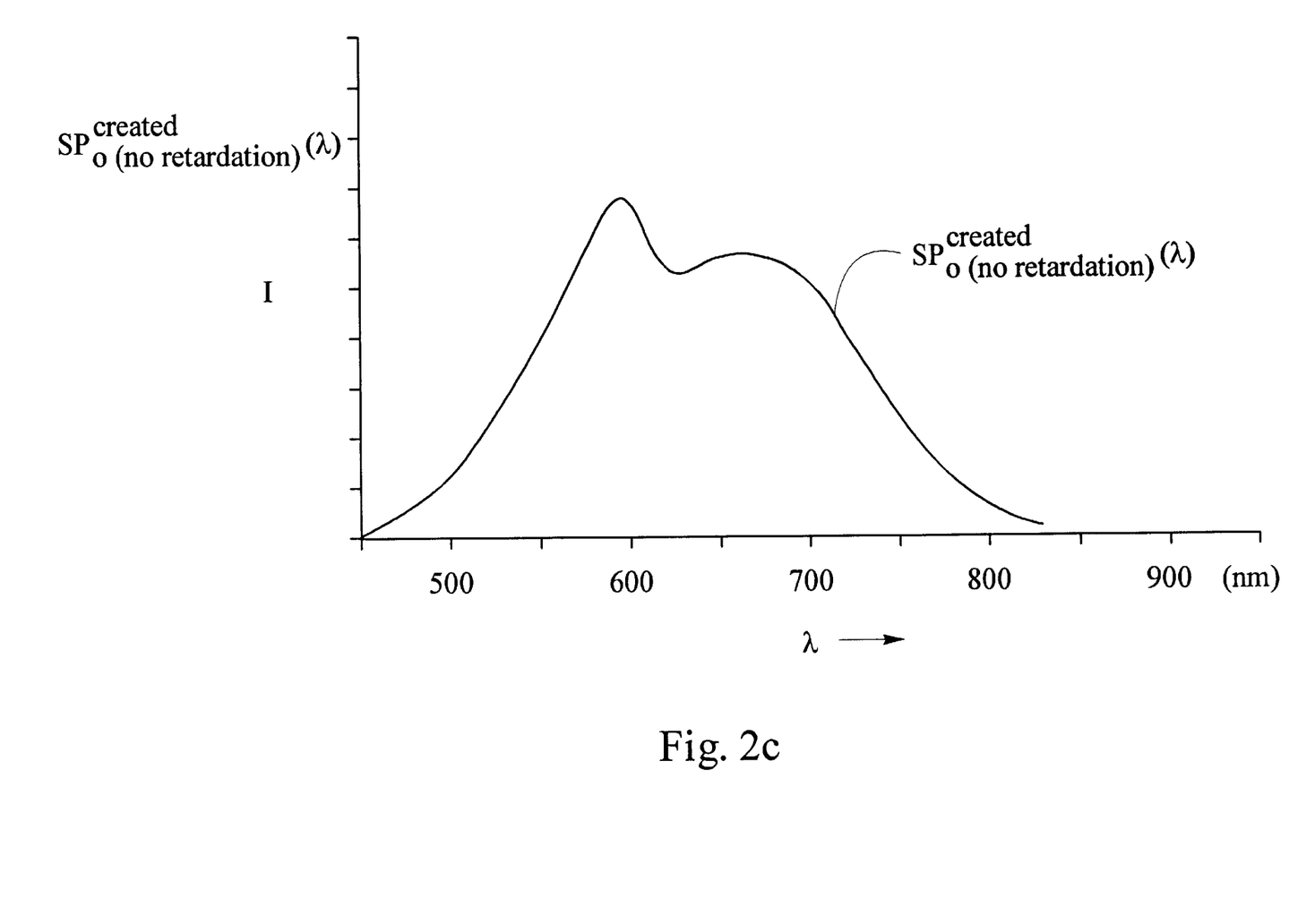

A typical created spectral intensity array is illustrated in FIG. 2c. Hence each spectral intensity may be demodulated by normalising with respect to the created no retardation spectral intensity:

$$\frac{SP''_{0-retardation}(\lambda)}{SP^{created}_{o(no\ retardation)}(\lambda)} = 1 - \sin(2\alpha)\sin(\phi)$$

$$= SP_0^{demod}(\lambda)$$

$$\frac{SP''_{240-retardation}(\lambda)}{SP^{created}_{o(no\ retardation)}(\lambda)} = 1 - \sin 2(\alpha + \pi/3)\sin(\phi)$$

$$= SP_{240}^{demod}(\lambda)$$

$$\frac{SP''_{120-retardation}(\lambda)}{SP^{created}_{o(no\ retardation)}(\lambda)} = 1 - \sin 2(\alpha + 2\pi/3)\sin(\phi)$$

$$= SP_{120}^{demod}(\lambda)$$

Figure 3:
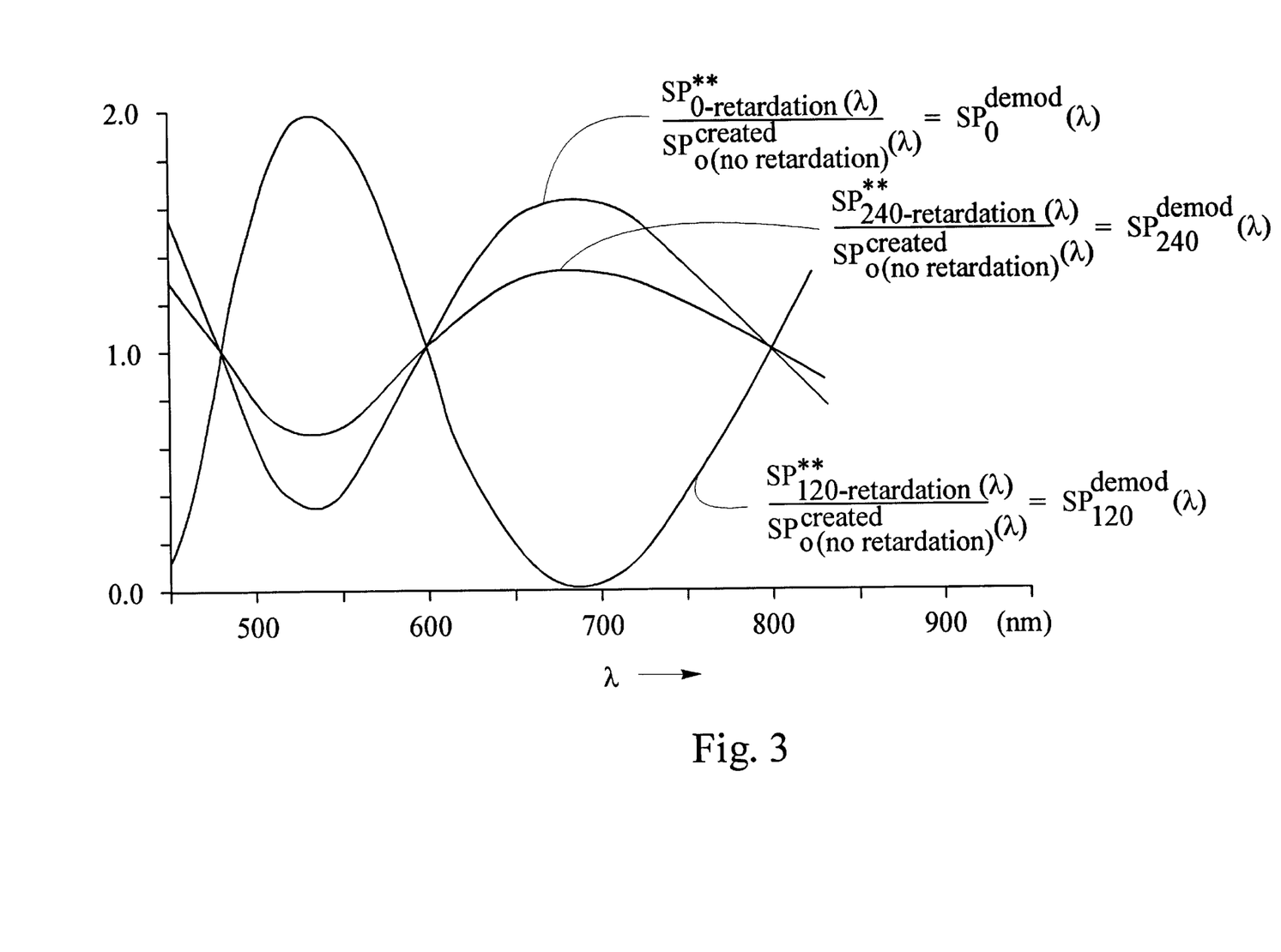
FIG. 3 illustrates a typical set of demodulated interference patterns, one for each of the three polarizers in the observer head.

A typical set of these demodulated interference patterns is illustrated in FIG. 3. These show that in practice there is one combining device providing the largest amplitude of modulation and the other two being of lesser amplitude and 180° out of phase. Each of these patterns are of the form $SP(\lambda_i) = 1 - S.A.\sin(2\pi R/\lambda_i)$, to which they may be fitted in a variety of ways including curve fitting, and where $2\pi R/\lambda = \phi$, S is a variable representing the phase of the modulation, and thus may take the value of +1 or −1 to accommodate positive or negative values of $\alpha$, A is a variable with value of 0 to 1 (ie. the amplitude of the modulation), $\lambda_i$ is the midpoint wavelength for each array location and R is the magnitude of the retardation occurring in the birefringent material.

Figure 4:
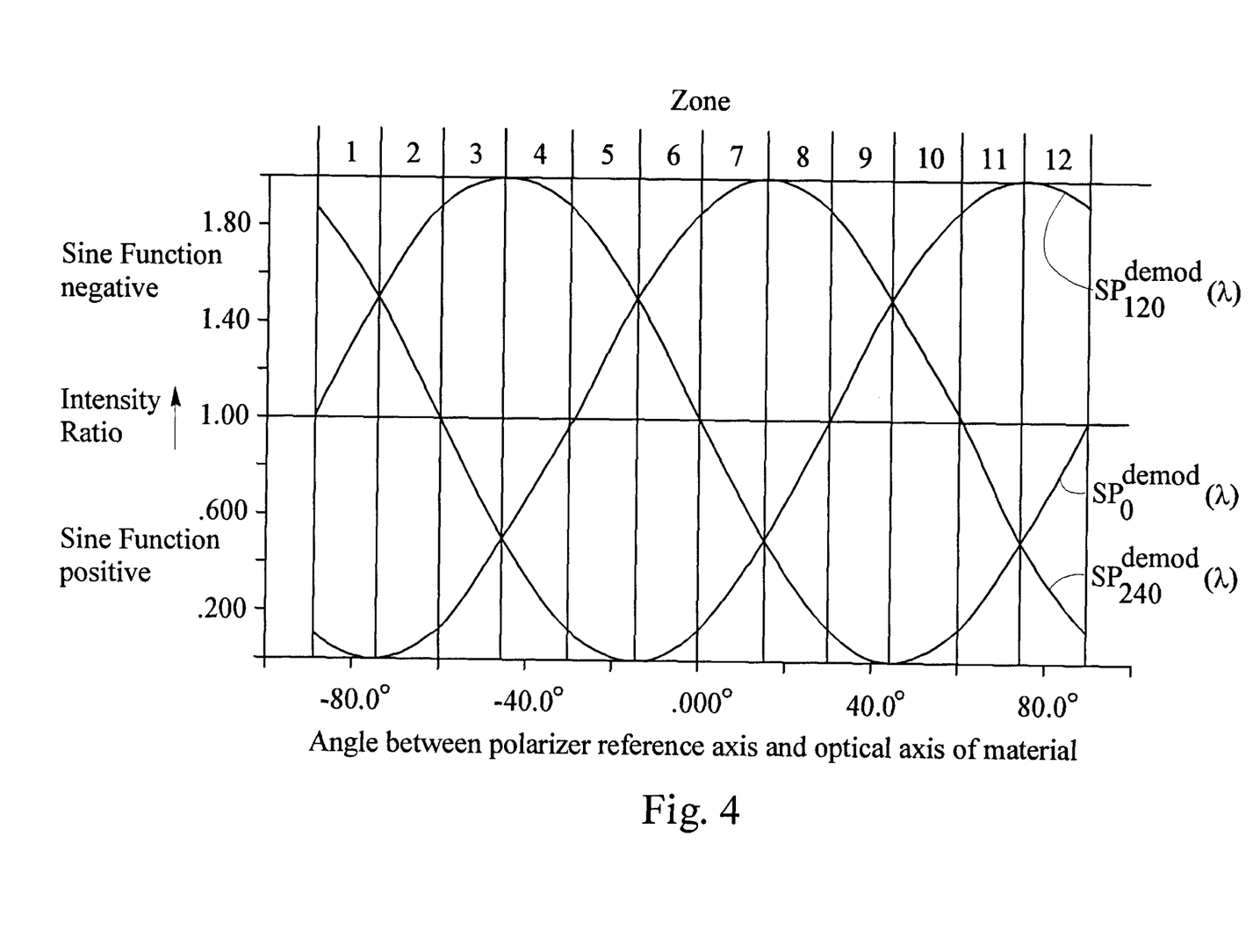
FIG. 4 illustrates the intensity variations to be expected in light received by each of the three polarizers in the observer head, as a function of the changes in angle between the principal optical axis.

Now consider the functions $SP_0^{demod}$, $SP_{240}^{demod}$ and $SP_{120}^{demod}$, which are graphed in FIG. 4 using an arbitrary value of $\phi = 90°$ over the region of $\alpha = -90°$ to $+90°$. By inspection it can be seen that this region is segregated into unique regions which may be described in terms of which polarizer provides for the largest depth of modulation (with unity representing no depth of modulation), which the middle, and the sign of the function given by the sine of two times the angle $\alpha$.

Now if we form
$R_1 = SP_0^{demod} - 1$,
$R_2 = SP_{240}^{demod} - 1$,
and
$R_3 = SP_{120}^{demod} - 1$,
and consider the results of forming $R_1/R_2$, $R_2/R_1$, $R_2/R_3$, $R_3/R_2$, $R_1/R_3$, and $R_3/R_1$, and expanding to generate expressions for $\alpha$, then $$\text{from } R_1/R_2 \text{ we have } \alpha = \tfrac{1}{2}\tan^{-1}\{(\sqrt{3}.R_1/R_2)/(2 + R_1/R_2)\}$$

$$\text{from } R_2/R_1 \alpha = \tfrac{1}{2}\tan^{-1}\{\sqrt{3}/(1 + 2.R_2/R_1)\}$$

$$\text{from } R_2/R_3 \alpha = \tfrac{1}{2}\tan^{-1}\{(\sqrt{3}.(1 + R_2/R_3)/(1 - R_2/R_3)\}$$

$$\text{from } R_3/R_2 \alpha = \tfrac{1}{2}\tan^{-1}\{(\sqrt{3}.(1 + R_3/R_2)/(R_3/R_2 - 1)\}$$

$$\text{from } R_1/R_3 \alpha = \tfrac{1}{2}\tan^{-1}\{(-\sqrt{3}.R_1/R_3)/(2 + R_1/R_3)\}$$

$$\text{and from } R_3/R_1 \alpha = \tfrac{1}{2}\tan^{-1}\{-\sqrt{3}/(1 + 2.R_3/R_1)\}$$

However all these values of $\alpha$ are only defined in the region −45° to +45° ±n.90°. But now consider that the choice of $SP_0(\lambda)$ being aligned at 0° to the reference was arbitrary, and also consider the sequence by which the functions $SP_0^{demod}$, $SP_{240}^{demod}$, and $SP_{120}^{demod}$ provide for one function to have the greatest depth of modulation and the second to have the middle (ie. not the greatest and not the least) depth of modulation for all angles −90° to +90° relative to the perpendicular reference. Further consider the sign of the $\sin 2\alpha$, $\sin 2(\alpha+60)$ and $\sin 2(\alpha-60)$ portions of the expressions. The sign of these functions, S, was determined from the curve fitting to the interference patterns. Thus the angular range −90° to +90° may be subdivided into twelve 15° for which the greatest, medium and sign values occur as shown in Table 1. Thus knowledge of these three pieces of data provide for unique placement of α into a 15° segment in the range −90° to +90°.

TABLE 1

| Zone | Angle Range | Greatest depth of modulation provided by | Medium depth of modulation provided by | Sign of the sine two time angle function | Angular correction |
|---|---|---|---|---|---|
| 1 | −90° to −75° | $SP_{120}^{demod}$ | $SP_{240}^{demod}$ | +ve | −90° |
| 2 | −75° to −60° | $SP_{120}^{demod}$ | $SP_{0}^{demod}$ | +ve | −90° |
| 3 | −60° to −45° | $SP_{0}^{demod}$ | $SP_{120}^{demod}$ | −ve | −90° |
| 4 | −45° to −30° | $SP_{0}^{demod}$ | $SP_{240}^{demod}$ | −ve | 0° |
| 5 | −30° to −15° | $SP_{240}^{demod}$ | $SP_{0}^{demod}$ | +ve | 0° |
| 6 | −15° to 0° | $SP_{240}^{demod}$ | $SP_{120}^{demod}$ | +ve | 0° |
| 7 | 0° to 15° | $SP_{120}^{demod}$ | $SP_{240}^{demod}$ | −ve | 0° |
| 8 | 15° to 30° | $SP_{120}^{demod}$ | $SP_{0}^{demod}$ | −ve | 0° |
| 9 | 30° to 45° | $SP_{0}^{demod}$ | $SP_{120}^{demod}$ | +ve | 0° |
| 10 | 45° to 60° | $SP_{0}^{demod}$ | $SP_{240}^{demod}$ | +ve | 90° |
| 11 | 60° to 75° | $SP_{240}^{demod}$ | $SP_{0}^{demod}$ | −ve | 90° |
| 12 | 75° to 90° | $SP_{240}^{demod}$ | $SP_{120}^{demod}$ | −ve | 90° |

Now α is fully defined by the previously developed expressions of $R_1/R_2$, $R_2/R_1$, $R_2/R_3$, $R_3/R_2$, $R_1/R_3$, and $R_3/R_1$, thus α may now be mapped directly into the respective 15° zone using the angle corrections given in Table 1.

Alternatively, different combinations of the demodulated spectral interference patterns and angular zones may be used, so as to both shift the reference angle and subsequently correct for it, thereby avoiding regions of the tangent function tending towards plus or minus infinity.

The depth of modulation, required to rank the responses, may be determined, among other methods, by consideration of the spectral signals from each polarizer at one wavelength or by summation of the normalized spectral energies received by each polarizer after corrections have been made for channel attenuation variations, polarizer inefficiencies and similar variations. The angular computations may be performed in a number of ways, including using one wavelength responses, or using all wavelength responses and averaging the results to reduce noise variations, or by using the responses for those wavelengths at or near the peak of the demodulated signal, or by using most wavelength responses but avoiding those where the responses tend to zero and are thus most prone to noise contamination.

Thus α the angular orientation of the principal optical axes on the surface of the birefringent coating, relative to the chosen reference, may be measured, without ambiguity, in the −90° to +90° range and transformed into the axes system of the birefringent material using the offset angle determined as part of the setup. Thus through symmetry the optical axes are fully defined. This approach is also valid, but the trigonometrical expressions more cumbersome, for the cases where the separation angles are not equal and for cases using more than three observer channels.

The present invention is not limited to the embodiments that have been described above; rather, it is capable of variations and modifications, such as the use of prisms as the spectral separation means, linear detector arrays rather than two dimensional arrays, incorporation of the spectral separation means with the observer optics thereby removing the requirement for fibre optic elements, the use of reflectors such that the light passes and repasses through the material, the use of beam splitters in the optical path such that the illuminating and receiving optical paths may be coaxial, the use with light having a narrow spectrum or that is monochromatic, application in determining the preferred axis of polarization of the illuminated material or in the light emerging from that material, and in other ways which will be evident to persons skilled in the art.

What I claim is:

1. In an optical system comprising a plurality of optical components including a light source, and a birefringent material having principal and quadrature optical axes, a method of determining the directions of these optical axes, comprising the steps of:

a) providing input light, including multiple wavelengths of light, having a predetermined polarization state to the birefringent material and wherein the light that is provided comprises any portion or portions of the electro-magnetic spectrum for which the birefringent material is not opaque and for which it exhibits characteristic optical axes;

b) passing at least some of the light through plural combining means for combining the quadrature components of at least some of the light that has passed through at least some of the birefringent material to cause some of that light to interfere, and for which each combining means is set at a known direction;

c) detecting and recording information, for each of the plural combining means, corresponding to the intensity of at least some of the light passed through the combining means to obtain plural intensity measurements;

d) in dependence upon the intensity measurements, using an appropriately programmed computer or other computational means to calculate the optical axes directions of the light emerging from the birefringent material and thus the optical axes directions existing in the birefringent material, by use of relative intensities from two or more of the combining means, the known directions of the axes of these combining means, the angular offset between the reference axis for the combining means and the reference direction for the birefringent material, and the theoretical variations in intensities to be expected between two or more of these combining means when light of the predetermined polarization state is passed through birefringent material having principal and quadrature optical axes.

2. The method as defined in claim 1, wherein the plural combining means in step b) comprise a plurality of polarizers, of known or identical ellipticity, each with its axis of polarization set at different known directions.

3. The method as defined in claim 1, wherein the input light is elliptically polarized.

4. The method as defined in claim 1, wherein the input light is provided on a time discontinuous basis to the birefringent material such that light is predominantly supplied only during the time period that detecting and recording occurs.

5. The method as defined in claim 1, wherein the light in step b), after having passed through at least some of the birefringent material, is reflected so as to repass through at least some of the birefringent material before at least some of this light passes to the plural combining means.

6. The method as defined in claim 5, wherein an angular relationship is established between the direction of the light provided by the light source and the direction of the light received by the plural combining means by locating the means for providing polarized light and the plural means for combining the quadrature components of the light such that the plural combining means do not receive light from the light source that is reflected from a surface of the birefringent material without that light having first passed through at least some of the birefringent material.

7. The method as defined in claim 1, wherein instead of using the birefringent material a material having a preferred direction of polarization is used, and wherein in step d), the direction of this preferred direction of polarization is calculated.

8. The method as defined in claim 1, wherein instead of using the birefringent material any other non-opaque material is used, and the light emerging from it has a preferred direction of polarization, and wherein in step d), the direction of this preferred direction of polarization is calculated.

9. The method as defined in claim 1, wherein the illumination means provides any form of polarized or non-polarized light, which emerges from any non-opaque material, and wherein the light emerging has a preferred direction of polarization, and wherein in step d), the direction of this preferred direction of polarization is calculated.

10. In an optical system comprising of a plurality of optical components including a light source and a birefringent material having principal and quadrature optical axes, a method of determining the directions of these optical axes, comprising the steps of:
   a) providing input light, including multiple wavelengths of light, having a predetermined polarization state to the birefringent material;
   b) passing at least some of the light through plural combining means for combining the quadrature components of at least some of the light that has passed through at least some of the birefringent material to cause some of that light to interfere, and for which the axis of each combining means is set at a known direction;
   c) for each of the combining means, spectrally separating at least some of the light that has passed through the combining means, by passing at least some of the light through spectral separation means,
   d) detecting and recording information, for each of the plural combining means, corresponding to intensity and wavelength of at least some of the light that has passed through the combining means and the spectral separation means, to obtain plural spectral signatures, wherein each of the spectral signatures comprises differing amplitudes relating to at least a plurality of the multiple wavelengths of light;
   e) in dependence upon the spectral signatures, calculating the optical axes directions of the light emerging from the birefringent material and thus the optical axes directions existing in the birefringent material by using an appropriately programmed computer or other computational approach and utilizing the signal amplitudes in whole or in part of the spectral signatures from two or more of the combining means, the known directions of the axes of these combining means, and the phase of the amplitude variations when compared to relative amplitude variations to be expected in the spectral signatures between one or more of these combining means when light of the predetermined polarization state is passed through birefringent material possessing characteristic principal and quadrature optical axes and birefringence similar to that existing in the birefringent material.

11. The method as defined in claim 10, wherein the input light is provided on a time discontinuous basis to the birefringent material such that light is predominantly supplied only during the time period that the detecting and recording occurs.

12. The method as defined in claim 10, wherein a reflector is disposed in the system such that the provided light having passed through at least some of the birefringent material, is reflected so as to repass through at least some of the birefringent material before at least some of this light passes to the plural combining means.

13. The method as defined in claim 10, wherein an angular relationship is established between the direction of the light provided by the light source and the direction of the light received by the plural combining means by locating the means for providing polarized light and the plural means for combining the quadrature components of the light such that the plural combining means do not receive light from the light source that is reflected from a surface of the birefringent material without that light having first passed through at least some of the material.

14. The method as defined in claim 10, wherein instead of using the birefringent material, material having a preferred direction of polarization is used, and wherein in step d), the direction of this preferred direction of polarization is calculated.

15. The method as defined in claim 10, wherein instead of using the birefringent material any other non-opaque material is used, and the light emerging from it has a preferred direction of polarization, and wherein in step d), the direction of this preferred direction of polarization is calculated.

16. The method as defined in claim 10, wherein the illumination means provides any form of polarized or non-polarized light, which emerges from any non-opaque material, and wherein the light emerging has a preferred direction of polarization, and wherein in step d), the direction of this preferred direction of polarization is computed.

17. A method as defined in claim 10, wherein the known state of polarization of the input light is circular, or elliptically polarized and closely approaches circular polarization, and wherein in step b) the combining of the quadrature components of the emerging light is performed by a plurality of linear polarizers, each with its axis of polarization oriented at known directions, for each of which at least some of the light that has passed through the birefringent material passes, these polarizers acting in parallel, and wherein step e) includes the step of demodulation of the spectral signatures and includes the step of normalising each of the spectral signatures obtained from the light emerging from each of the linear polarizers by using the reconstructed unmodulated (by the birefringent material) spectral signature obtained by applying a summation process to the spectral signatures obtained from some or all of the plurality of linear polarizers, the summation process being dependant on the number of polarizers and the directions of their polarization axes, the optical axes calculation process then being performed by consideration of the relative amplitudes of modulation in the spectral interference signatures, for either all the wavelengths for which intensity measurements were made or for a subset of wavelengths.

18. A method as defined in claim 10, wherein the spectral signatures obtained are demodulated to remove the spectral variations attributable to the light source and attenuations attributable to all optical elements and detectors in the light path, thus obtaining a spectral interference signature, this being the resultant modulation attributable to the effect of the birefringent material, the demodulation being effected by normalising each of the spectral signatures obtained from the light emerging from each of the combining means by using the reconstructed unmodulated spectral signature obtained by applying a summation process to the spectral signatures obtained from some or all of the plurality of combining means, the summation process being dependent on the number of combining means and the directions of their polarization axes.

19. An apparatus for use in determining the directions of the characteristic principal and quadrature optical axes within a birefringent material, comprising:

means, including a light source, for providing polarized light of known state of polarization, plural means for combining quadrature components of some of this light that has passed through the birefringent material thereby inducing interference, the optical axes of the plural combining means being at different but known directions, means for measuring intensity of the combined light, means for storing intensity measurements, computation means programmed to compare the stored intensity values obtained from the combining means, and based upon the intensity values and the known directions of the axes of the combining means, to calculate the direction of the principal axis within the birefringent material and of the axis in quadrature to the principal axis, these directions being calculated with respect to a reference direction for the axes of the combining means.

20. An apparatus as defined in claim 19, wherein the plural means for combining the quadrature components of the light are elliptical polarizers, for which the directions of the axes are different and such that for at least one, the axis is at an orientation to the optical axes of the birefringent material other than in alignment to either of these axes, and preferably where the polarizers are linear or are close to being linear.

21. An apparatus comprising in addition to that defined in claim 19, an angular position measurement and transfer means for establishing an angular relationship between a reference frame of the birefringent material, being a face or a chosen direction on the birefringent material, and the reference direction of the axes of the combining means; this angular relationship then being usable by the computational means to translate the calculated directions of the axes into the reference frame of the birefringent material.

22. The apparatus as defined in claim 19, wherein instead of using the birefringent material any non-opaque material having a preferred direction of polarization is used, and wherein the direction of this preferred direction of polarization is computed.

23. The apparatus as defined in claim 19, wherein instead of using the birefringent material any non-opaque material is used and the light emerging from it has a preferred direction of polarization, and wherein the direction of this preferred direction of polarization is computed.

24. The apparatus as defined in claim 19, wherein the means which includes a light source, provides any form of polarized or non-polarized light which emerges, and wherein the light is directed onto any non-opaque material or system of materials, and wherein the light emerging from this material or materials has a preferred direction of polarization, and wherein this preferred direction of polarization is calculated.

25. An apparatus as defined in claim 19, including a reflector means disposed in the light path for causing light that has passed through the birefringent material to repass back through the material and thence to the combining means.

26. An apparatus as defined in claim 25, wherein a means for beam separation is included for directing at least some of the reflected light out of the path of the provided polarized light, thereby directing it to the combining means.

27. An apparatus for use in determining the directions of characteristic principal and quadrature optical axes within a birefringent material, comprising:

means for providing polarized light of known state of polarization containing a plurality of wavelengths to the birefringent material, plural means for combining quadrature components of some of the light that has passed through the birefringent material to induce spectral interference, the optical axes of the plural combining means being at different but known directions, angular position measurement and transfer means for establishing an angular relationship between a reference frame of the birefringent material, being a face or a chosen direction on the birefringent material, and the reference direction of the axes of the combining means, spectral separation means for receiving the light from the plurality of combining means and spatially separating the light on the basis of wavelength, means for measuring intensity of received separated light and for measuring intensity at a plurality of wavelengths, means for storing intensity measurements, computation means programmed to provide spectral arrays from information relating to the stored intensity measurements obtained from the combining means, and based upon the intensity values and the known directions of the axes of the combining means, to calculate the direction of the principal axis within the birefringent material and of the axis in quadrature to the principal axis with respect to the reference axes directions of the plural combining means, and to translate these calculated directions into the reference frame of the birefringent material.

28. A method as defined in claim 10, wherein intensity summations are formed from information relating to the stored intensity measurements made of the light that has passed through each of the combining means, and based upon these intensity summations and using the known directions of the axes of the combining means, the direction of the principal axis within the birefringent material and of the axis in quadrature to the principal axis are calculated with respect to the reference directions of the axes of the combining means or any other reference basis used to define the orientation of the measurement system.

* * * * *